(12) United States Patent
Arthur et al.

(10) Patent No.: US 7,718,291 B2
(45) Date of Patent: May 18, 2010

(54) FUEL CELL STACK END CELL CONTROL METHODOLOGY

(75) Inventors: David A. Arthur, Honeoye Falls, NY (US); Abdullah B. Alp, West Henrietta, NY (US)

(73) Assignee: GM Global Technology Operations, Inc., Detroit, MI (US)

(*) Notice: Subject to any disclaimer, the term of this patent is extended or adjusted under 35 U.S.C. 154(b) by 777 days.

(21) Appl. No.: 11/669,965

(22) Filed: Feb. 1, 2007

(65) Prior Publication Data

US 2008/0187787 A1    Aug. 7, 2008

(51) Int. Cl.
*H01M 8/04* (2006.01)

(52) U.S. Cl. .......................................... 429/26

(58) Field of Classification Search .............. 429/26
See application file for complete search history.

(56) References Cited

U.S. PATENT DOCUMENTS

| | | | |
|---|---|---|---|
| 6,562,500 B2 | 5/2003 | Katagiri et al. | |
| 6,686,080 B2 | 2/2004 | Farkash et al. | |
| 7,160,640 B2 * | 1/2007 | Houlberg | 429/26 |
| 2004/0137295 A1 | 7/2004 | Houlberg | |

* cited by examiner

*Primary Examiner*—Patrick Ryan
*Assistant Examiner*—Thomas H. Parsons
(74) *Attorney, Agent, or Firm*—Dinsmore & Shohl LLP

(57) ABSTRACT

A method of controlling the relative humidity in an electrochemical conversion device comprises the steps of: providing a fuel cell stack comprising a plurality of fuel cells stackingly arranged, and at least one heater coupled to at least one end fuel cell; selecting a relative humidity setpoint for the at least one end cell; calculating an end cell membrane electrode assembly temperature setpoint using the relative humidity setpoint; calculating a heater temperature setpoint equal to the calculated end cell membrane electrode assembly temperature setpoint plus a computed temperature difference from the at least one end cell membrane electrode assembly to the heater; and adjusting the temperature of the end cell heater until it reaches the heater temperature setpoint and thereby achieves the relative humidity setpoint of the at least end cell membrane electrode assembly.

17 Claims, 5 Drawing Sheets

FUEL CELL STACK END CELL CONTROL METHODOLOGY

FIELD OF THE INVENTION

The present invention is generally directed to electrochemical conversion cells e.g. fuel cells, and is specifically directed to controlling the water content of the fuel cell by regulating the relative humidity of at least one end cell in a fuel cell stack.

BACKGROUND OF THE INVENTION

The present invention relates to electrochemical conversion cells, commonly referred to as fuel cells, which produce electrical energy by processing first and second reactants. For example, electrical energy can be generated in a fuel cell through the reduction of an oxygen-containing gas and the oxidation of a hydrogenous gas. By way of illustration and not limitation, a typical cell comprises a membrane electrode assembly (MEA) positioned between a pair of flowfields accommodating respective ones of the reactants. More specifically, a cathode flowfield plate and an anode flowfield plate can be positioned on opposite sides of the MEA. The voltage provided by a single cell unit is typically too small for useful application so it is common to arrange a plurality of cells in a conductively coupled "stack" to increase the electrical output of the electrochemical conversion assembly.

The membrane electrode assembly typically comprises a proton exchange membrane separating an anode layer and a cathode layer of the MEA. The MEA is typically characterized by enhanced proton conductivity under wet conditions. For the purpose of describing the context of the present invention, it is noted that the general configuration and operation of fuel cells and fuel cell stacks is beyond the scope of the present invention. Rather, the present invention is methods of controlling the water content in the electrochemical conversion cell, specifically by regulating the relative humidity of an end cell via a heater.

During operation, a fuel cell stack is susceptible to loss of heat to the environment (e.g., conductive heat loss through attached hardware), particularly at the ends of the fuel cell stack. This loss of heat results in the temperature of the fuel cell stack being non-uniform along its length, with the end cells of the fuel cell stack comprising lower temperatures than the rest of the cells. Due to the temperature drop, water passing through the fuel cell may condense in the relatively cooler cells at the end of the fuel cell stack.

Condensation of water within the fuel cells at the end of the fuel cell stack is problematic since water can block the flow channels and flood the fuel cell. Flooding decreases voltage by not allowing reactants to reach the reaction sites and overall performance of the fuel cell stack decreases. In addition, flooding may also result in dehydration in other areas of the fuel cell stack. As a result, there is a continuing demand to control the water content of a fuel cell stack and the individual fuel cells making up the fuel cell stack.

Regarding the general configuration and operation of fuel cells and fuel cell stacks, applicants refer to the vast collection of teachings covering the manner in which fuel cell "stacks" and the various components of the stack are configured. For example, a plurality of U.S. patents and published applications relate directly to fuel cell configurations and corresponding methods of operation. More specifically, FIGS. 1 and 2 of U.S. Patent Application Pub. No. 2005/0058864 (now U.S. Pat. No. 6,974,648) and the accompanying text present a detailed illustration of the components of one type of fuel cell stack and this particular subject matter is expressly incorporated herein by reference.

SUMMARY OF THE INVENTION

In one embodiment of the present invention, a method of controlling the relative humidity in an electrochemical conversion device is provided. The method includes providing a fuel cell stack comprising a plurality of fuel cells stackingly arranged, and at least one heater coupled to at least one end fuel cell disposed on at least one end of the fuel cell stack, wherein each fuel cell comprises a membrane electrode assembly. The method further comprises the steps of: selecting a relative humidity setpoint for the end cell membrane electrode assembly; calculating an end cell membrane electrode assembly temperature setpoint using the relative humidity setpoint; calculating a heater temperature setpoint, the temperature being equal to the calculated end cell membrane electrode assembly temperature setpoint plus a computed temperature difference from at least one end cell membrane electrode assembly to the heater; and adjusting the temperature of the end cell heater until it reaches the heater temperature setpoint and thereby achieves the relative humidity setpoint of the at least end cell membrane electrode assembly.

In another embodiment of the present invention, a method of controlling the relative humidity in an electrochemical conversion device is provided. The method includes providing a fuel cell stack comprising a plurality of fuel cells stackingly arranged, and at least one heater coupled to at least one end fuel cell disposed on at least one end of the fuel cell stack, wherein each fuel cell comprises a membrane electrode assembly. The method further comprises the steps of: calculating a relative humidity for the fuel cell stack; selecting a relative humidity setpoint for the end cell membrane electrode assembly less than the relative humidity of the fuel cell stack; calculating an end cell membrane electrode assembly temperature setpoint using the relative humidity setpoint; calculating a heater temperature setpoint, the temperature being equal to the calculated end cell end cell membrane electrode assembly temperature setpoint plus a computed temperature difference from the at least one end cell membrane electrode assembly to the heater; comparing the end cell heater temperature setpoint to a temperature reading of the end cell heater; and adjusting the temperature of the end cell heater until it reaches the heater temperature setpoint and thereby achieves the relative humidity setpoint of the at least end cell membrane electrode assembly.

Additional features and advantages provided by the systems and methods of the present invention will be more fully understood in view of the following detailed description, in conjunction with the drawings

BRIEF DESCRIPTION OF THE DRAWINGS

The following detailed description of the illustrative embodiments of the present invention can be best understood when read in conjunction with the following drawings, where like structure is indicated with like reference numerals and in which.

DETAILED DESCRIPTION

Figure 1:
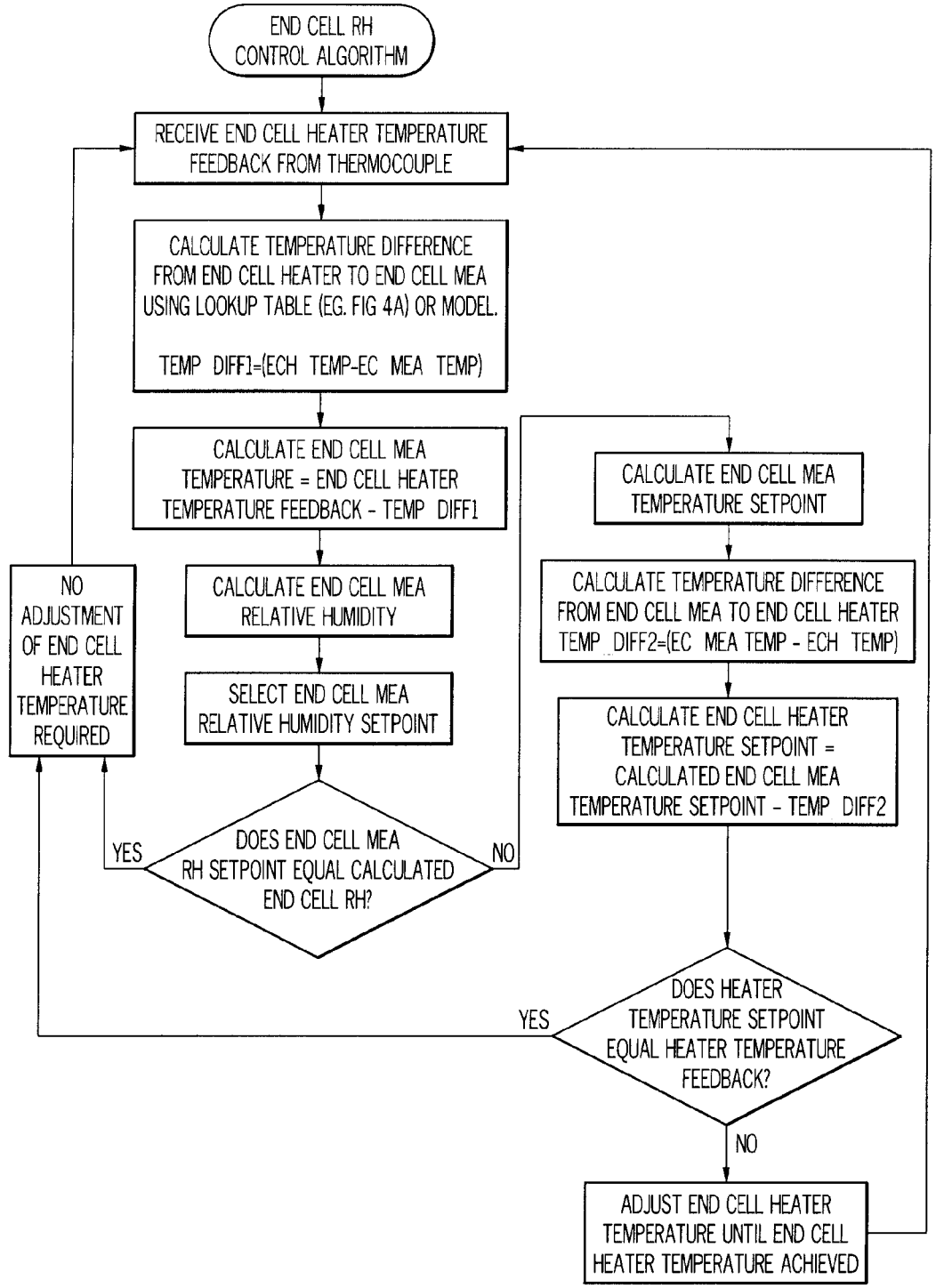
FIG. 1 is a flow chart illustrating the method of controlling the relative humidity of the end cells of the fuel cell stack in accordance with one or more embodiments of the present invention.
Figure 2A:
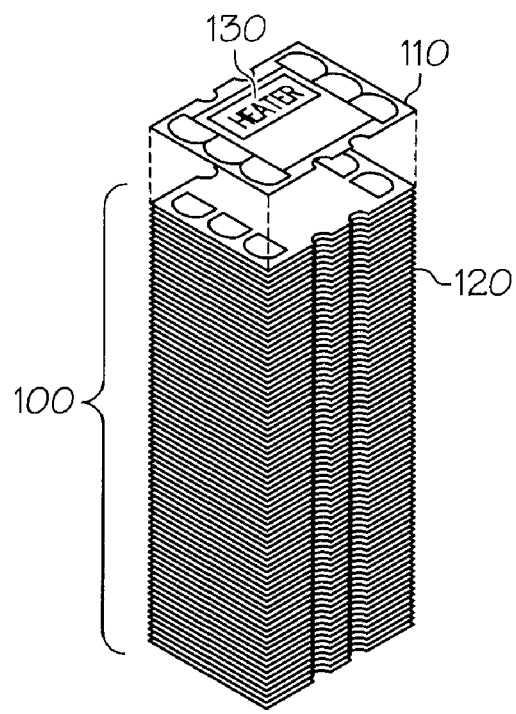
FIG. 2a is a schematic illustration of the electrochemical conversion device according to one or more embodiments of the present invention.
Figure 2B:
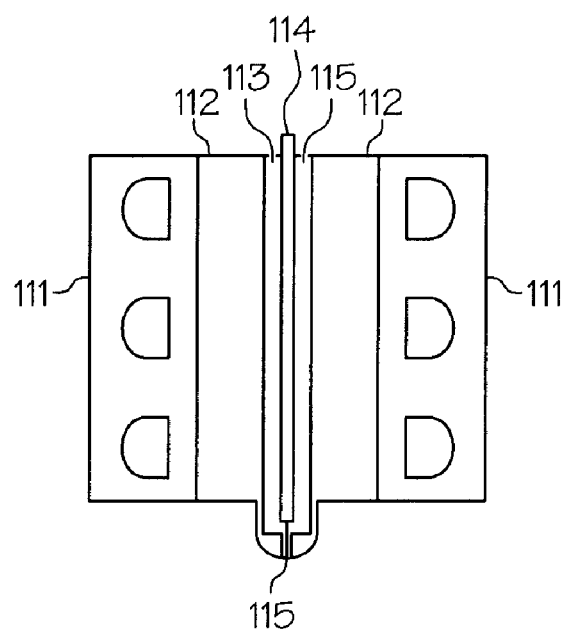
FIG. 2b is a schematic illustration of the end cell membrane electrode assembly according to one or more embodiments of the present invention.
Figure 3:
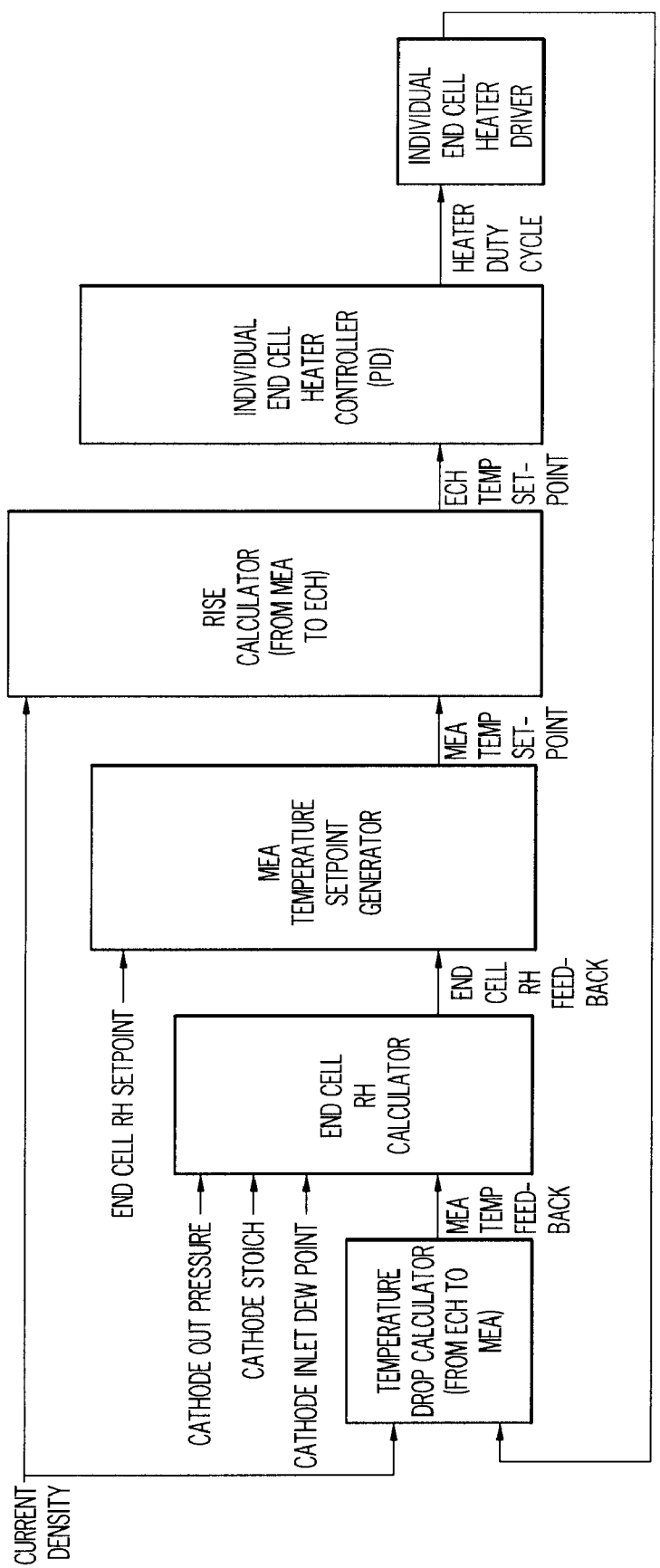
FIG. 3 is another flow chart illustrating the method of controlling the relative humidity of the end cells of the fuel cell stack in accordance with one or more embodiments of the present invention, wherein the figure graphically shows what inputs and outputs are needed by each block (each block represents a calculation or manipulation of some kind)

Referring to FIGS. 1, 2a, 2b, and 3, a method of controlling the relative humidity in an electrochemical conversion device is provided. The method is performed utilizing an electrochemical conversion device 1, which comprises a fuel cell stack 100, for example, a proton exchange membrane fuel cell stack, wherein the fuel cell stack 100 comprises a plurality of fuel cells 120 stackingly arranged. The fuel cell stack 100 comprises at least one heater 130 coupled to at least one end fuel cell 110 disposed on at least one end of the fuel cell stack 100. Each fuel cell 120 stack includes end cells 110 and other fuel cells disposed between the end cells 110, and each fuel cell and end cell 110 comprises a membrane electrode assembly 115. Referring to FIG. 2b, the membrane electrode assembly 115 is disposed between the gas diffusion layers 112 and the flowfields 111.

The method comprises the step of selecting a relative humidity setpoint for the end cell membrane electrode assembly 115. In one embodiment, the user may select a setpoint through experimentation, for example, trial and error. Generally, the relative humidity setpoint for the end cell membrane electrode assembly 115 is less than the relative humidity of the entire fuel cell stack to prevent condensation of water droplets in the end cell 110.

Based on the relative humidity setpoint of the end cell membrane electrode assembly 115, the temperature setpoint of the end cell membrane electrode assembly may be calculated. In one embodiment, the temperature may be calculated with the following End Cell Relative Humidity (ECRH) equation:

$$ECRH = \frac{100 * COP}{\left[10^{7.093 - \frac{1674.5}{229.15 + ECT}}\right]} \cdot \frac{\left[CS + 0.21\left(1 - \frac{10^{7.093 - \frac{1674.5}{229.15 + CIDT}}}{COP + CPD}\right)\right]}{[2*0.21] + \left[\left(\frac{10^{7.093 - \frac{1674.5}{229.15 + CIDT}}}{COP + CPD}\right)(CS - 2*0.21)\right]}$$

where COP is the Cathode Outlet Pressure of the End Cell [kPa], CPD is the Cathode Pressure Drop in the End Cell [kPa], CIDT is the Cathode Inlet Dewpoint Temperature [° C.], ECT is the temperature of the end cell membrane electrode assembly [° C.] which was calculated above, and CS is the Cathode Stoichiometry. The Cathode Stoichiometry (CS) is calculated by the equation $$CS = \frac{AirMassFlow}{4.33 * \left[\frac{CellCount * StackCurrent}{(1.6022 * 10^{-19})(6.022 * 10^{23})}\right] * \left[\frac{1}{4}\right] * 2 * 15.994}$$

where AirMassFlow is the air flow rate in the cathode [g/s], CellCount is the number of fuel cells in the fuel cell stack, and StackCurrent [amps] is the amount of current in the fuel cell stack. In addition to calculating the end cell relative humidity, the relative humidity for the fuel cell stack may be calculated using this equation.

Figure 4A:
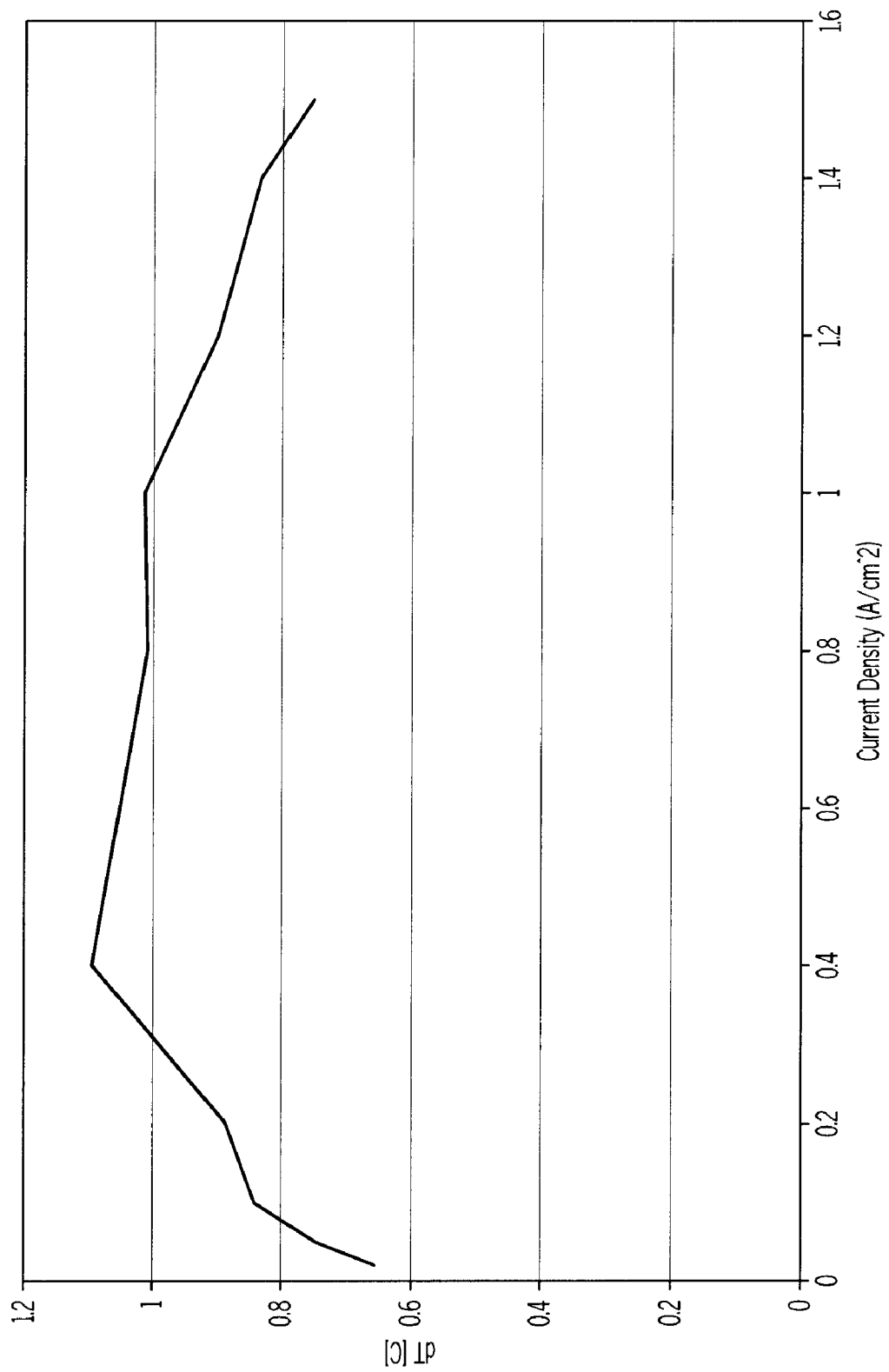
FIG. 4a is a graphical illustration depicting the experimental determination of the temperature change (dT) at various current densities wherein dT=End Cell Heater Temperature Feedback minus End Cell MEA Temperature Feedback according to one or more embodiments of the present invention.
Figure 4B:
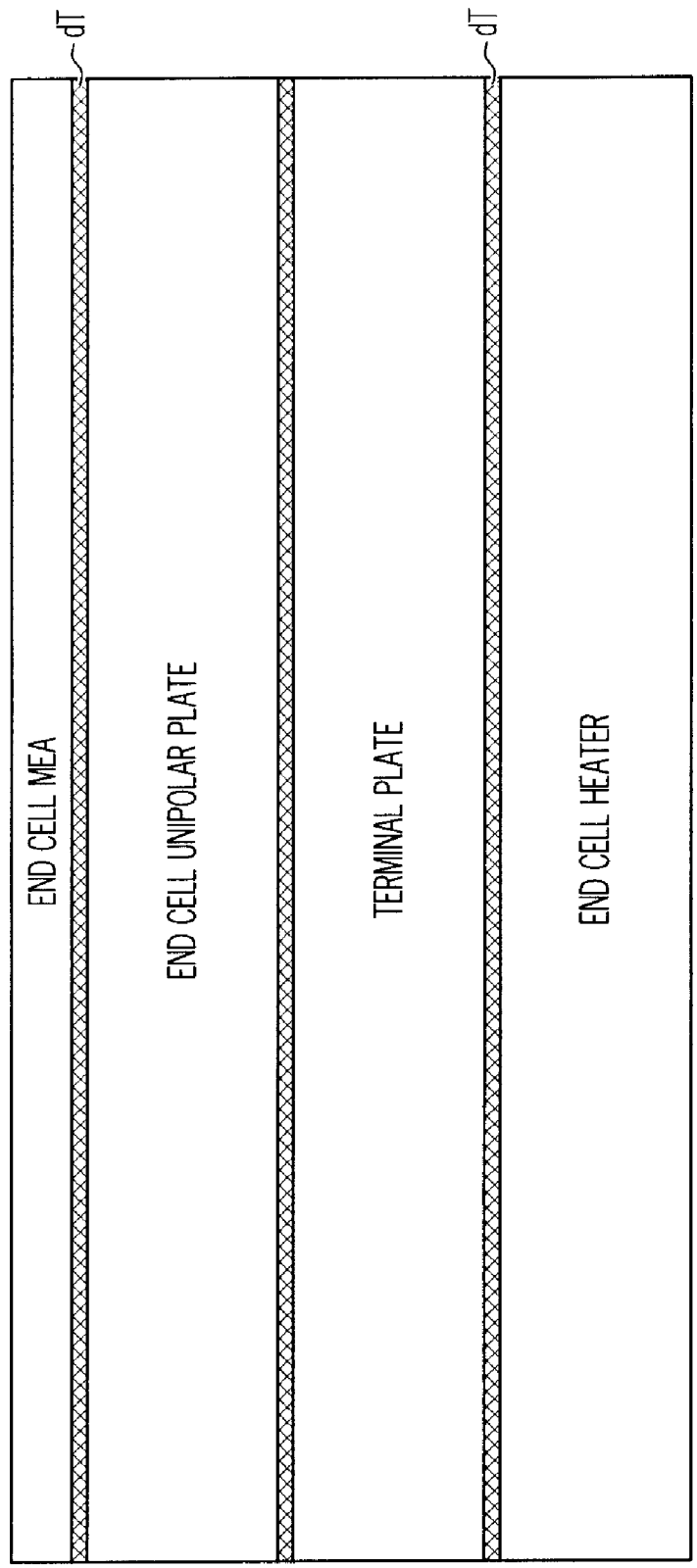
FIG. 4b is a schematic illustration of the experimental structure used to generate the graphical values of FIG. 4a according to one or more embodiments of the present invention.

In a further embodiment, the process may include calculating the temperature of the membrane electrode assembly 115 of the at least one end cell 110. The temperature of the end cell membrane electrode assembly 115 is equal to a temperature reading of the heater 130 minus a computed temperature difference from the heater 115 to the at least one end cell membrane electrode assembly 130. In one embodiment, the temperature reading of the heater 130 is obtained by a thermocouple attached to the heater 130. The computed temperature difference is obtained through the graphical analysis of FIGS. 4a and 4b, wherein the temperature rise or drop is plotted against current density. The current density equals the gross current going through the stack (as measured by a current sensor at the stack terminals) divided by the active area of a cell. In one exemplary embodiment, the stacks have an active area of 360 cm², and are capable of 0-450 amps, which scales to a current density range of 0-1.25 A/cm². The current delivered is represented on the x-axis of this graph in terms of current density. For each point, the current density (or current/active area) is drawn for a period of time we determine to be steady state. Then the heater temperature is noted as well as a special MEA thermocouple at the same instant in time. The difference of these two values is the y-axis of the graph. As an alternative to the graph, the temperature change values may be obtained from a lookup table, for example, Table 1 below which lists various temperature change values from the end cell to the heater:

TABLE 1

| Current Density | dT (Temperature Change from End Cell to End Cell Heater) |
|---|---|
| 0.020 | 0.657 |
| 0.051 | 0.747 |
| 0.005 | 0.840 |
| 0.200 | 0.887 |
| 0.400 | 1.093 |
| 0.600 | 1.050 |
| 0.800 | 1.010 |
| 1.001 | 1.013 |
| 1.201 | 0.9 |
| 1.400 | 0.833 |
| 1.500 | 0.753 |

Linear interpolation may be used to determine a temperature change from end cell to the end cell heater at various current density values. In addition, this temperature change (dT) can be modeled using other methods/models. This table comprises experimental data based one implementation of this invention. It is contemplated that the model could include factors such as dT varying along the face of the end cell plate (both in x and y). These modeled values could be averaged together to get a more aggregate dT or used individually to, for example, never allow any one point on the plate to go below some pre-determined MEA RH. Additional transient factors may also be considered. The table model example considers steady state points at particular current densities; however, it is contemplated to include the effects of an uptransient, where the system starts at a low current density and quickly increases to a much higher current density. The dT may be changing in some way throughout that uptransient until the high current density steady state point is reached as indicated on the table.

The method further comprises calculating a heater temperature setpoint. The heater temperature setpoint is equal to the calculated end cell membrane electrode assembly temperature setpoint plus a computed temperature difference from the at least one end cell membrane electrode assembly to the heater. The computed temperature difference is obtained from the graphical method of FIGS. 4a and 4b, or from Table 1. At which point, the temperature of the end cell heater is adjusted until it reaches the heater temperature setpoint. By achieving the heater temperature setpoint, the system is able to achieve the relative humidity setpoint of the at least end cell membrane electrode assembly. Alternatively, if the relative humidity feedback of the end cell is equal to the actual relative humidity of the end cell, then calculating the heater temperature setpoint, and adjusting the heater would be unnecessary, because the heater would already be at its setpoint. Achieving this relative humidity setpoint helps control water migration in the fuel cell, prevents condensation of water into droplets. Additionally, this method helps overly avoid drying the end cells during warm-up, which can result in pinhole formation and/or end cell voltage degradation. This method prevents liquid water from blocking reaction sites in end cells while ensuring durability of the end cells.

In one embodiment, the heater temperature setpoint and the heater temperature feedback from the thermocouple may be compared using a proportional-integral-derivative (PID) controller. The PID controller is also operable to calculate an individual duty cycle for each end cell heater. As would be familiar to one ordinary skill in the art, this temperature error or difference between the setpoint and the heater temperature is used in the PID by multiplying the error by the 'P' gain, multiplying the error over time by the 'I' gain, and multiplying the slope at which the errors are converging by the 'D' gain. Basically the PID controller takes the temperature error as an input and adapts it to a duty cycle (i.e. more or less current) sent to the end cell heater. The P gain is instantly higher with higher error. For example, if the setpoint is 80° C., but the feedback is 70° C., then the 10° C. error is multiplied instantly by the P gain of, say, 5% per ° C. The I gain integrates this error over time, so that even if the P gain is not enough gain to get to setpoint, the I will start "winding up" to ensure this. If the error at t=0 is 10° C. and the I gain is 0.1%*sec/° C., then for each second that the error remains 10° C., the duty cycle will increase by 1% (0.1%*sec/° C.*1 sec*10° C.). The P contribution would be added to the I contribution as time goes on. The D-gain is looking at how quickly the error is increasing or decreasing. For example, if the error is 10° C., but is changing at −10° C./sec, then the D-gain would counter both the P and the I gain to prevent overshoot.

The following example illustrates how the method of controlling relative humidity is performed

EXAMPLE 1

In this example, the following is assumed: Cathode Outlet Pressure (COP)=135 kPa; Cathode Pressure Drop (CPD)=15 kPa; Cathode Stoichiometry (CS)=1.8; Cathode Inlet Dewpoint Temperature (CIDT)=54° C.; Coolant Outlet Temperature=80° C.

By utilizing the coolant outlet temperature as the ECT variable in the end cell RH equation, this set of inputs results in a calculated cathode outlet RH for the whole stack of 80%. If the setpoint for the end cell relative humidity setpoint is 70%, the end cell membrane electrode assembly temperature setpoint must be 83.3° C. by using all the inputs above. Next, this end cell membrane electrode assembly temperature setpoint must be translated to an end cell heater setpoint, using the lookup table of Table 1, the graph of FIG. 4a, or perhaps even another model as described earlier. If the current density is at 0.8 A/cm$^2$, then the temperature difference from the end cell membrane electrode assembly to the end cell heater is 1.01° C. To obtain the end cell heater temperature setpoint, add the temperature change to the end cell membrane electrode assembly setpoint (1.01° C.+83.3° C.=84.31° C.). After determining an end cell heater temperature setpoint of 84.31° C., the heater is controlled until the thermocouple feedback reads 84.31° C. by adjusting the individual duty cycle of the heater until the heater temperature setpoint is reached. As soon as the end cell heater temperature feedback reaches 84.31° C., the relative humidity of the end cell membrane electrode assembly is at 70% (assuming none of the other parameters have changed). In a dynamic drive cycle, setpoints can change very frequently, so the end cell heater temperature setpoint may be recalculated often.

It is noted that terms like "generally", "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of controlling the relative humidity in an electrochemical conversion device comprising:

providing a fuel cell stack comprising a plurality of fuel cells stackingly arranged, and at least one heater coupled to at least one end fuel cell disposed on at least one end of the fuel cell stack, wherein each fuel cell comprises a membrane electrode assembly;

selecting a relative humidity setpoint for the end cell membrane electrode assembly;

calculating an end cell membrane electrode assembly temperature setpoint using the relative humidity setpoint;

calculating a heater temperature setpoint, the temperature being equal to the calculated end cell membrane electrode assembly temperature setpoint plus a computed temperature difference from the at least one end cell membrane electrode assembly to the heater; and adjusting the temperature of the end cell heater until it reaches the heater temperature setpoint and thereby achieves the relative humidity setpoint of the at least end cell membrane electrode assembly.

2. A method according to claim 1 wherein the relative humidity of the end cell membrane electrode assembly is calculated from the End Cell Relative Humidity (ECRH) equation:

$$ECRH = \frac{100 * COP}{\left[10^{7.093-\frac{1674.5}{229.15+ECT}}\right]} \Big/ \frac{\left[CS + 0.21\left(1 - \frac{10^{7.093-\frac{1674.5}{229.15+CIDT}}}{COP+CPD}\right)\right]}{[2*0.21] + \left[\left(\frac{10^{7.093-\frac{1674.5}{229.15+CIDT}}}{COP+CPD}\right)(CS - 2*0.21)\right]}$$

where COP is the Cathode Outlet Pressure of the End Cell [kPa], CPD is the Cathode Pressure Drop in the End Cell [kPa], CIDT is the Cathode Inlet Dewpoint Temperature [° C.], ECT is said temperature of the end cell membrane electrode assembly [° C.], and CS is the Cathode Stoichiometry.

3. A method according to claim 2 wherein the Cathode Stoichiometry (CS) is calculated by the equation $$CS = \frac{AirMassFlow}{4.33 * \left[\frac{CellCount * StackCurrent}{(1.6022*10^{-19})(6.022*10^{23})}\right] * \left[\frac{1}{4}\right] * 2 * 15.994}$$

where AirMassFlow is the air flow rate in the cathode [g/s], CellCount is the number of fuel cells in the fuel cell stack, and StackCurrent [amps] is the amount of current in the fuel cell stack.

4. A method according to claim 2 wherein the end cell membrane electrode assembly temperature setpoint is calculated using the End Cell Relative Humidity (ECRH) equation, wherein the ECRH variable equals an end cell relative humidity setpoint.

5. A method according to claim 1 further comprising calculating the temperature of the membrane electrode assembly of the at least one end cell, the at least end cell membrane electrode assembly temperature being equal to a temperature reading of the heater minus a computed temperature difference from the heater to the at least one end cell membrane electrode assembly.

6. A method according to claim 1 wherein the relative humidity setpoint for the end cell membrane electrode assembly is less than the relative humidity of other fuel cells.

7. A method according to claim 1 further comprising comparing the end cell heater temperature setpoint to a temperature reading of the end cell heater.

8. A method according to claim 7 wherein the comparison is performed by a proportional-integral-derivative (PID) controller.

9. A method according to claim 1 wherein the end cell relative humidity setpoint is determined through experimentation.

10. A method according to claim 1 wherein the temperature difference values are obtained from a lookup table or a graphical model.

11. A method according to claim 1 wherein the temperature reading of the end cell is obtained through a thermocouple connected to the heater.

12. A method of controlling the relative humidity in an electrochemical conversion device comprising:
providing a fuel cell stack comprising a plurality of fuel cells stackingly arranged, at least one heater coupled to at least one end fuel cell disposed on at least one end of the fuel cell stack, wherein each fuel cell comprises a membrane electrode assembly;
calculating a relative humidity for the fuel cell stack;
selecting a relative humidity setpoint for the end cell membrane electrode assembly less than the relative humidity of the fuel cell stack;
calculating an end cell membrane electrode assembly temperature setpoint using the relative humidity setpoint;
calculating a heater temperature setpoint, the temperature being equal to the calculated end cell membrane electrode assembly temperature setpoint plus a computed temperature difference from the at least one end cell membrane electrode assembly to the heater;
comparing the end cell heater temperature setpoint to a temperature reading of the end cell heater; and
adjusting the temperature of the end cell heater until it reaches the heater temperature setpoint and thereby achieves the relative humidity setpoint of the at least end cell membrane electrode assembly.

13. A method according to claim 12 wherein the relative humidity of the end cell membrane electrode assembly is calculated from the End Cell Relative Humidity (ECRH) equation:

$$ECRH = \frac{100 * COP}{\left[10^{7.093-\frac{1674.5}{229.15+ECT}}\right]} \Big/ \frac{\left[CS + 0.21\left(1 - \frac{10^{7.093-\frac{1674.5}{229.15+CIDT}}}{COP+CPD}\right)\right]}{[2*0.21] + \left[\left(\frac{10^{7.093-\frac{1674.5}{229.15+CIDT}}}{COP+CPD}\right)(CS - 2*0.21)\right]}$$

where COP is the Cathode Outlet Pressure of the End Cell [kPa], CPD is the Cathode Pressure Drop in the End Cell [kPa], CIDT is the Cathode Inlet Dewpoint Temperature [° C.], ECT is said temperature of the end cell membrane electrode assembly [° C.], and CS is the Cathode Stoichiometry.

14. A method according to claim 13 wherein the end cell membrane electrode assembly temperature setpoint is calculated using the End Cell Relative Humidity equation, wherein the ECRH variable equals an end cell relative humidity setpoint.

15. A method according to claim 13 wherein the relative humidity for the fuel cell stack is calculated using the End Cell Relative Humidity equation, wherein the ECT variable equals a coolant outlet temperature for the fuel cell stack.

16. A method according to claim 12 wherein the comparison is performed by a proportional-integral-derivative (PID) controller.

17. A method according to claim 12 wherein the temperature reading of the end cell is obtained through a thermocouple connected to the heater.

* * * * *